(12) United States Patent
Burke et al.

(10) Patent No.: US 8,387,763 B2
(45) Date of Patent: Mar. 5, 2013

(54) RETRACTABLE CORD REEL

(75) Inventors: Paul C. Burke, Waukegan, IL (US); Richard Skowronski, North Hampton, NH (US)

(73) Assignee: Telefonix, Inc., Waukegan, IL (US)

( * ) Notice: Subject to any disclaimer, the term of this patent is extended or adjusted under 35 U.S.C. 154(b) by 75 days.

(21) Appl. No.: 12/951,354

(22) Filed: Nov. 22, 2010

(65) Prior Publication Data
US 2012/0126047 A1 May 24, 2012

(51) Int. Cl.
*H04M 1/15* (2006.01)
(52) U.S. Cl. .................. 191/12.2 R; 191/12 R
(58) Field of Classification Search ............ 191/12.2 R, 191/12 R; 242/378, 378.4; 254/395, 396, 254/393
See application file for complete search history.

(56) References Cited

U.S. PATENT DOCUMENTS

| | | | |
|---|---|---|---|
| 1,276,825 A | 8/1918 | Swope et al. | |
| 1,384,153 A * | 7/1921 | Roos | 242/388.91 |
| 1,446,410 A | 2/1923 | Bennett et al. | |
| 1,737,978 A | 11/1929 | Sebell et al. | |
| 1,865,069 A | 6/1932 | Allen | |
| 1,958,626 A | 5/1934 | Krantz | |
| 2,206,352 A | 7/1940 | Hellmann et al. | |
| 2,211,561 A | 8/1940 | Flannely et al. | |
| 2,262,587 A | 11/1941 | Kaempf et al. | |
| 2,678,779 A | 5/1954 | Bellmer et al. | |
| 2,979,576 A | 4/1961 | Huber | |
| 3,061,234 A | 10/1962 | Morey | |
| 3,369,084 A * | 2/1968 | Cook | 191/12.4 |
| 3,584,157 A | 6/1971 | Prescott et al. | |
| 3,657,491 A * | 4/1972 | Ryder et al. | 191/12.2 R |
| 3,782,654 A * | 1/1974 | Kasa | 242/388.1 |
| 3,835,267 A * | 9/1974 | Sharpe | 191/12.4 |
| 3,840,713 A * | 10/1974 | Carpentier | 191/12.2 R |
| 3,876,045 A * | 4/1975 | Knarreborg | 191/12.2 R |
| 3,880,378 A * | 4/1975 | Ballenger | 242/388.6 |
| 3,904,843 A * | 9/1975 | Kendechy | 200/332 |
| 4,053,118 A | 10/1977 | Aikins | |
| 4,061,290 A * | 12/1977 | Harrill | 242/402 |
| 4,062,608 A | 12/1977 | Pierce | |
| 4,083,621 A * | 4/1978 | Davidson et al. | 439/501 |
| 4,136,840 A * | 1/1979 | Bates | 242/395.1 |
| 4,244,536 A * | 1/1981 | Harrill | 242/405.3 |
| 4,350,850 A * | 9/1982 | Kovacik et al. | 191/12.2 R |
| 4,384,688 A | 5/1983 | Lindsley | |
| 4,472,010 A | 9/1984 | Parnello | |
| 4,646,987 A | 3/1987 | Peterson | |
| 4,721,833 A * | 1/1988 | Dubay | 191/12.4 |
| 4,726,538 A * | 2/1988 | Kovacik et al. | 242/376 |
| 5,094,396 A * | 3/1992 | Burke | 242/378.2 |
| 5,101,082 A * | 3/1992 | Simmons et al. | 191/12.2 R |

(Continued)

OTHER PUBLICATIONS

US District Court Case No. 1:12-cv-04362—*Telefonix Inc.* v. *Response Engineering, Inc* and *Richard Skowronski*—Amended Complaint-Jun. 7, 2012.

(Continued)

*Primary Examiner* — Jason C Smith
(74) *Attorney, Agent, or Firm* — Niro, Haller & Niro

(57) ABSTRACT

A retractable cord reel is disclosed. The retractable cord reel may have a rotatable ferrule configured to adapt to an expandable coil having various trajectories within the cord reel. The retractable cord reel may have a splicing chamber filled with an epoxy or similar substance. Improved heat dissipation vents and fins and a thermal overload device may also be provided.

25 Claims, 7 Drawing Sheets

U.S. PATENT DOCUMENTS

| | | | |
|---|---|---|---|
| 5,195,823 A * | 3/1993 | Sidabras | 362/387 |
| 5,236,371 A * | 8/1993 | Matthis | 439/501 |
| 5,332,171 A * | 7/1994 | Steff | 242/378 |
| 5,354,011 A | 10/1994 | Rozon | |
| 5,381,981 A * | 1/1995 | Nelson | 242/407.1 |
| 5,418,701 A * | 5/1995 | Hart | 362/376 |
| D363,461 S | 10/1995 | Duckman | |
| D365,012 S * | 12/1995 | Sather | D8/359 |
| 5,507,446 A | 4/1996 | Ditzig | |
| 5,526,997 A | 6/1996 | Karczmer | |
| 5,535,960 A * | 7/1996 | Skowronski et al. | 242/378.4 |
| 5,544,836 A | 8/1996 | Pera | |
| 5,581,821 A | 12/1996 | Nakano | |
| 5,645,147 A * | 7/1997 | Kovacik et al. | 191/12.2 R |
| 5,655,143 A | 8/1997 | Alpert | |
| 5,655,726 A | 8/1997 | Peterson | |
| 5,671,833 A | 9/1997 | Edwards et al. | |
| 5,697,572 A | 12/1997 | Salentine et al. | |
| 5,708,262 A | 1/1998 | Goldman et al. | |
| 5,718,310 A * | 2/1998 | Gallo | |
| 5,732,898 A * | 3/1998 | Odessky et al. | |
| 5,762,281 A * | 6/1998 | Foley | |
| 5,797,558 A | 8/1998 | Peterson et al. | |
| D399,126 S | 10/1998 | Edwards et al. | |
| 5,841,628 A | 11/1998 | Alpert et al. | |
| 5,893,528 A | 4/1999 | Strokosz et al. | |
| 6,019,304 A | 2/2000 | Skowronski et al. | |
| 6,019,630 A | 2/2000 | Alpert | |
| 6,036,098 A | 3/2000 | Goldman et al. | |
| 6,045,393 A | 4/2000 | Alpert | |
| 6,065,080 A | 5/2000 | Alpert | |
| 6,140,923 A * | 10/2000 | Lam | |
| 6,176,433 B1 * | 1/2001 | Uesaka et al. | |
| 6,273,354 B1 * | 8/2001 | Kovacik et al. | |
| 6,293,485 B1 | 9/2001 | Hollowed | |
| 6,305,958 B1 | 10/2001 | Maegawa et al. | |
| 6,328,243 B1 | 12/2001 | Yamamoto | |
| RE37,590 E | 3/2002 | Leyden et al. | |
| 6,372,988 B1 * | 4/2002 | Burke et al. | |
| 6,386,906 B1 * | 5/2002 | Burke | |
| 6,416,005 B1 | 7/2002 | Liao | |
| 6,419,175 B1 * | 7/2002 | Rankin, VI | |
| 6,421,044 B2 | 7/2002 | Murphy | |
| 6,439,360 B1 * | 8/2002 | Miller | |
| 6,439,491 B1 | 8/2002 | Liao | |
| 6,474,585 B2 | 11/2002 | Liao | |
| 6,495,756 B1 | 12/2002 | Burke et al. | |
| 6,517,022 B1 * | 2/2003 | Bailey | |
| 6,523,753 B2 | 2/2003 | Cocuzza et al. | |
| 6,532,653 B1 | 3/2003 | Alpert | |
| 6,575,649 B1 | 6/2003 | Hsuing | |
| 6,578,683 B1 | 6/2003 | Burke et al. | |
| 6,588,444 B2 | 7/2003 | Paplow et al. | |
| 6,597,788 B2 | 7/2003 | James et al. | |
| RE38,211 E | 8/2003 | Peterson | |
| 6,616,080 B1 * | 9/2003 | Edwards et al. | |
| 6,690,277 B1 | 2/2004 | Hansen | |
| 6,702,077 B2 | 3/2004 | Skowronski | |
| 6,731,956 B2 | 5/2004 | Hanna | |
| 6,745,969 B1 | 6/2004 | Gouda | |
| 6,761,579 B2 | 7/2004 | Fort et al. | |
| 6,766,821 B1 | 7/2004 | Kovacik et al. | |
| 6,779,749 B2 * | 8/2004 | Laporta | |
| 6,808,138 B2 | 10/2004 | Liao | |
| 6,874,722 B2 * | 4/2005 | Wei | 242/378 |
| D504,606 S | 5/2005 | Kovacik et al. | |
| 6,891,113 B2 | 5/2005 | Fringeli et al. | |
| 6,896,543 B2 | 5/2005 | Fort et al. | |
| 6,964,114 B1 | 11/2005 | Chen | |
| 7,017,846 B2 | 3/2006 | Tsoi et al. | |
| 7,036,761 B2 | 5/2006 | Washington et al. | |
| 7,044,278 B2 * | 5/2006 | Cleveland | 191/12.4 |
| 7,053,774 B2 | 5/2006 | Sedon et al. | |
| 7,073,529 B1 * | 7/2006 | Harkey | 137/355.23 |
| 7,086,512 B2 * | 8/2006 | Shack et al. | 191/12.4 |
| 7,108,216 B2 | 9/2006 | Burke et al. | |
| 7,125,282 B2 * | 10/2006 | Huang | 439/501 |
| 7,151,356 B1 | 12/2006 | Chen | |
| 7,172,150 B1 | 2/2007 | Hutchison, II et al. | |
| 7,216,665 B1 | 5/2007 | Sims, Jr. | |
| 7,222,811 B2 * | 5/2007 | Chang | 242/378.1 |
| 7,317,446 B1 | 1/2008 | Murphy | |
| 7,364,109 B2 * | 4/2008 | Kuo | 242/373 |
| 7,385,522 B2 | 6/2008 | Belden, Jr. et al. | |
| 7,410,319 B1 | 8/2008 | Brower et al. | |
| D584,937 S | 1/2009 | Kovacik et al. | |
| D592,667 S | 5/2009 | Sheba | |
| D593,561 S | 6/2009 | Sheba | |
| D604,244 S | 11/2009 | Kovacik et al. | |
| 7,629,895 B2 | 12/2009 | Belden, Jr. et al. | |
| 7,665,684 B2 | 2/2010 | Salentine et al. | |
| D613,293 S | 4/2010 | Sheba | |
| D613,744 S | 4/2010 | Sheba et al. | |
| 7,692,099 B2 | 4/2010 | Burke | |
| 8,047,363 B2 | 11/2011 | Sheba et al. | |
| 8,180,410 B2 | 5/2012 | Kim | |
| 2004/0188558 A1 * | 9/2004 | Moon et al. | 242/403.1 |
| 2004/0200920 A1 * | 10/2004 | Wei | 242/378.4 |
| 2006/0006038 A1 * | 1/2006 | Beverlin | 191/12.2 R |
| 2006/0186248 A1 * | 8/2006 | Liao | 242/378 |

OTHER PUBLICATIONS

US District Court Case. 1:12-cv-04362—*Telefonix, Inc* v. *Response Engineering* and *Richard Skowronski* Answer, Affirmative Defenses and Counterclaims Jul. 16, 2012.

* cited by examiner

RETRACTABLE CORD REEL

FIELD OF THE INVENTION

The present invention relates generally to a retractable cord reel apparatus, and more specifically relates to a retractable cord reel with improvements in longevity and durability. More specifically, the invention deals with a cord reel assembly that may include, but is not limited to, improved features for longevity and durability including a ferrule or similar mechanical control for wire or cable management, a potting chamber for providing an improved connection between wire or cable segments, and an improved wire segment configuration and housing to provide for superior heat dissipation from the cord reel assembly.

BACKGROUND OF THE INVENTION

Retractable cord reels have been used in various applications to retractably store various types of cables. Typically, a reel might have a stationary end and a retractable end, the retractable end capable of extension from and retraction back into the reel, and a stationary end that does not move during extension or retraction. Such a configuration reduces the mess typically associated with loose wires, as well as dangers related to loose cords, hazardous operating environments and the like.

In one prior art retractable reel, the extendable and stationary portions of a cord may be separate, but may be connected for example by brush-like contacts. The brush-like contacts slide along the inside or outside of the rotating spool, effectively maintaining a continuous contact between the moving parts. However, there are numerous disadvantages to cord reels utilizing moving contacts. Such reels have a propensity to spark, making them unsuitable for hazardous or wet environments. Furthermore, while high voltage applications maintain sufficient connection between moving contacts, low voltage applications are less able to clear or bypass gaps, dirt, or debris, thereby frequently causing insufficient contact, especially over repeated use.

A second type of retractable cord reel has been developed that maintains a constant connection between the retractable and stationary ends of the cord without the use of brushes. The reel illustratively contains a spool divided into two chambers: one for holding a round retractable cord, and a second, expansion chamber holding a coil of flat cord that can be expanded within the reel housing. (Some cord reels have used a flat retractable cable but it is much less tolerant to twisting. Attempts have been made to use a round cord as the stationary expanding cord but it is inefficient and prone to jamming. The flat/round combination is the preferred embodiment.) The retractable cord is connected to the stationary end through an internal coil, which may expand through its chamber during rotation of the spool. An example of this type of reel is disclosed in U.S. Pat. No. 5,094,396 to Burke, the disclosure of which is hereby incorporated by reference.

The expansion cord length may be minimized by permitting expansion of the cord followed by a reverse-direction contraction of the cord. This process is illustrated in U.S. Pat. No. 6,372,988 to Burke, the disclosure of which is hereby incorporated by reference.

While these earlier approaches improved upon the prior art, such designs still left a number of problems in operation. For instance, prior multi chamber designs lack the ability to prevent the stationary expanding cord from being severely bent during reverse direction coiling. This movement may be analogized to the bending of a wire coat hanger where bending it at a large angle back and forth repeatedly will cause it to break. Similarly, in existing cord reel assemblies, the mechanical strain from the repeated severe, back and forth bending of the stationary expanding cord resulting from its reversing coiling direction creates a significant risk to the longevity of such cord reel assemblies. Thus, there is a need to provide a mechanism which reduces mechanical strain resulting from severe sharp bending angles in the operation of a stationary expanding cord inside a cord reel assembly. The present invention is directed toward allowing coiling without sharp or small radius bending, as occurred in the prior art. For instance, the present invention controls the minimum radius at which the wire will bend, that radius being controlled by the winding surface, as opposed to the prior art, in which the coil was exposed to a sharp, near zero radius bend thus producing strain and premature failure. Likewise, prior art cord reel assemblies employing the combination of the flat expanding cord and the round retractable cord create manufacturing problems which make the manufacture of a single unitary cord impractical. Thus, the existing manufacturing techniques call for the flat and round cord segments to be spliced together, such splicing can potentially create hazards to the longevity of the product, especially in operating environments which are corrosive or under operating conditions which could cause shorting or similar problems. Thus, there is a need to reduce or eliminate hazards from shorting or other problems resulting from adverse operating environments while not adversely impacting the manufacturing process related to such cord reel assemblies.

Furthermore, existing prior art cord reel assemblies provide a limitation on the current available for the operation of the assemblies, as the cords (especially the stationary, expanding flat cord) generate significant amounts of heat in relation to the current being carried. Thus, there is need for an improved configuration and design which enables improved heat dissipation for the stationary, expanding flat cord in such assemblies.

DEFINITION OF TERMS

The following terms are used in the claims of the patent as filed and are intended to have their broadest plain and ordinary meaning consistent with the requirements of the law:

Ferrule: A rotatable structure at least partially disposed with the spool and used to mechanically engage the expanding cord segment so as to reduce or eliminate the creation of severe sharp bending of the expanding cord during operation.

Splicing chamber: A chamber or cavity in a component of a cord reel where separate cords can be electrically joined. The splice chamber may include a cavity or pocket where the spliced connections can be immersed in and covered with an potting compound (e.g., an epoxy). The splicing chamber may be a integral part of a typical cord reel component such as in a spool section, or a separate component such as a splice block. The cavity portion of the splice chamber may include (but is not limited to), for instance, an integral part of the splice chamber, or it may be a separate part installed into a splice chamber, or it may include a polymer overmold over the splice. The cavity portion of the splice chamber allows the splice between cables such as the retractable cord and expanding cord segment to be environmentally sealed in a potting compound. The splice may be simply insulated or spaced but not insulated, and not potted or sealed. In certain configurations, the splice can be sealed in a potting compound, overmolded with a polymer or similar material. Some examples would be a splice that could be potted in the splice chamber, or potted in a separate part that is installed in the splicing chamber, or a splice can be potted and removed from a mold then placed in the splice chamber, or covered with a polymer overmold then placed in the splice chamber.

"Flat Cord" or "Flat Portion" comprises a plurality of conductive members, at least some of which are arranged in a substantially parallel, side-by-side configuration, and includes (but is not limited to) a series of round cables such as co-axial and twisted pairs laid side by side. The flat cord or flat portion may further include (but is not limited to) cords or cables which may be round as individual cables but, when taken together, form a substantially flat cable portion.

Where alternative meanings are possible, the broadest meaning is intended. All words used in the claims set forth below are intended to be used in the normal, customary usage of grammar and the English language.

SUMMARY OF THE INVENTION

The present invention relates to one or more of the following features, elements or combinations thereof.

One disclosed embodiment is directed to improvements in a retractable cord reel of the type having a rotating spool and cord expansion chamber. The reel has a brushless connection between a retractable portion of the cord and a stationary cord end of the assembly. This connection may be facilitated using the previously disclosed retractable reel that comprises a retractable portion and a expansion portion disposed within an expansion chamber.

The disclosed spool is capable of rotation within a stationary housing, which may be illustratively mounted on a wall or similar surface. The spool may be aligned within the housing such that the cord expansion chamber is adjacent to the external side opposite the mounting surface of the housing, improving the dissipation of heat generated in the expansion chamber. The external side of the housing may also comprise fins and/or vents, while a flange bordering the flat cord expansion chamber may also comprise vents. Such vents are configured to provide improved heat dissipation.

The disclosed apparatus contains, in one embodiment, a splicing chamber within which wires are separated from their round cord configuration and arranged into a flat cord. This chamber may be filled with an epoxy or silicone filler to increase resistance to water, dirt, vapor, and other elements. The splicing chamber may also comprise a thermal overload protection device. This device can be configured to automatically shut down the circuit during overload, requiring manual restart via a button on the device. A lever coupled to a rod-like button along the axis of the spool may enable the pressing of the restart button.

The expansion of the flat cord within the flat cord expansion chamber may be configured to allow the flat cord to wind back around the spool in a reverse direction after expansion. This unwinding and winding illustratively permits a cord that is approximately half the length to be used in the expansion chamber, thereby providing a superior product that weighs less, and has a shorter conductive cord length. In prior art models, during this reverse-direction winding, the innermost segment of the flat cord bended repeatedly to accommodate the changing direction of the coil.

As disclosed herein, a ferrule may be added to this innermost portion to prevent repetitive sharp bending of the flat cord segment, thereby improving the lifespan of the flat cord and therefore the apparatus. In the illustrative embodiment, the flat cord entering the expansion chamber may be positioned to have two ninety-degree bends prior to entering the opening in the ferrule. The flat cord entering the expansion chamber may also comprise a helical coil to accommodate the rotation of the ferrule relative to this portion of the cord.

Thus, it can be seen that one object of the disclosed invention is to provide a mechanism for the reduction of mechanical stresses on a cord segment and a resulting improvement in the durability of a cord reel assembly due to the elimination of repetitive bending at sharp angles.

A further object of the present invention is to provide a structure for the in situ sealing of spliced cord segments in a cord reel assembly so as to avoid any disruption in the manufacturing process of a cord reel assembly.

Still another object of the present invention is to provide a sealed coupling of power cord segments to as to improve the durability and to improve the capability of a cord reel assembly to operate under a wide variety of operating environments.

Yet another object of the present invention is to provide a mechanism for the improved thermal dissipation for cord segments in a cord reel assembly.

It should be noted that not every embodiment of the claimed invention will accomplish each of the objects of the invention set forth above. For instance, certain claimed embodiments of the invention will not require a thermal overload protection device. In addition, further objects of the invention will become apparent based upon the summary of the invention, the detailed description of preferred embodiments, and as illustrated in the accompanying drawings. Such objects, features, and advantages of the present invention will become more apparent in light of the following detailed description of a best mode embodiment thereof, and as illustrated in the accompanying drawings.

DETAILED DESCRIPTION OF EMBODIMENTS OF THE INVENTION

Figure 1:
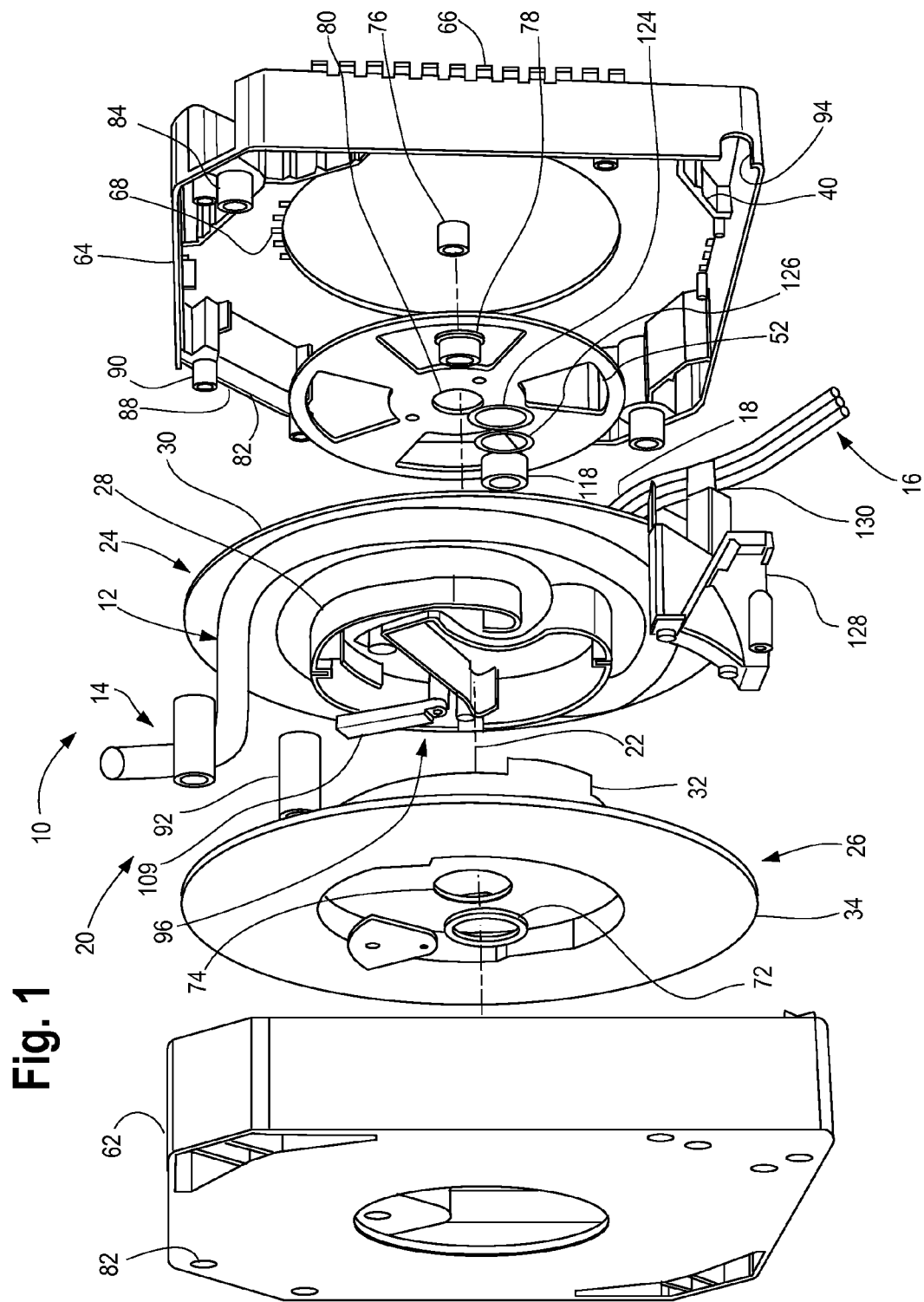
FIG. 1 is an exploded rear perspective view of a retractable cord reel assembly according to one embodiment of the present invention.

As can be seen in FIG. 1, the present invention comprises a retractable cord reel assembly 10 for managing and organizing a cord 12. It is contemplated that cord 12 could be a data line, a telephone line, an electric cable, or any other cable and/or wire or combination thereof for which retraction into a housing could be desirable.

Assembly 10 is illustratively configured such that the conductivity of cord 12 is continuous between retractable portion 14 and a stationary, opposite end 16 of cord 12. As set forth in detail below, assembly 10 is capable of many of these features due to cord 12 comprising a flat portion 18 that is capable of expansion in an enclosed expansion chamber while retractable portion 14 is withdrawn from assembly 10. Flat portion 18 illustratively comprises a plurality of conductive members arranged in a substantially parallel, side-by-side configuration. Retractable portion 14 illustratively comprises a plurality of elongated, seamless conductive members, each having a conductor substantially covered by an insulating layer, the conductive members being positioned so as to form a round cord.

Figure 2:
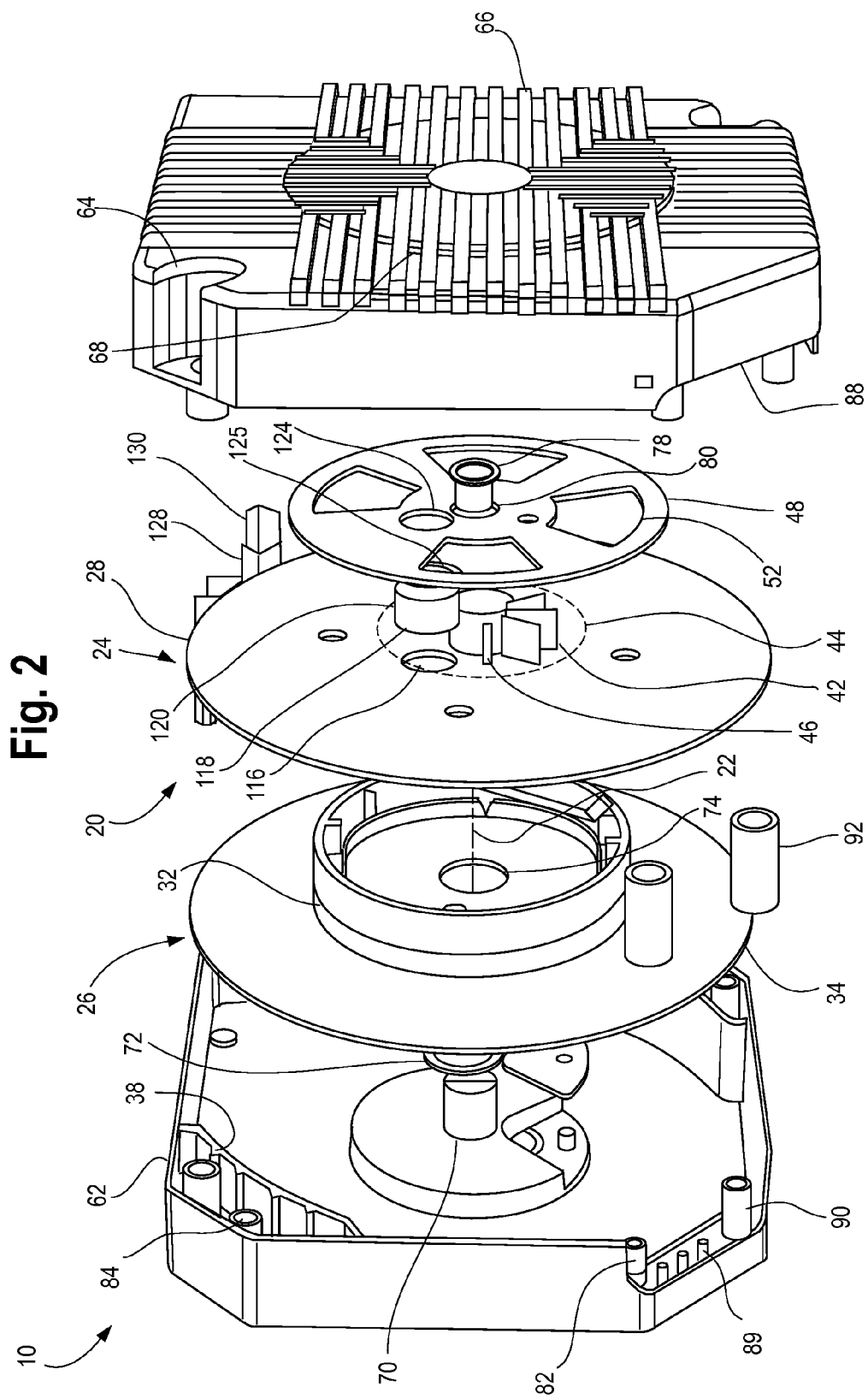
FIG. 2 is an exploded front perspective view of the retractable cord reel assembly of FIG. 1.

In the embodiment shown in FIGS. 1 and 2, the retractable cord reel assembly 10 comprises a spool 20 for rotation about axis 22. Spool 20 is disclosed as having a first section 24 and a second section 26. First section 24 comprises a cylindrical wall 28 coupled to a radial wall 30, and second section 26 comprises a cylindrical wall 32 coupled to a radial wall 34.

Figure 3:
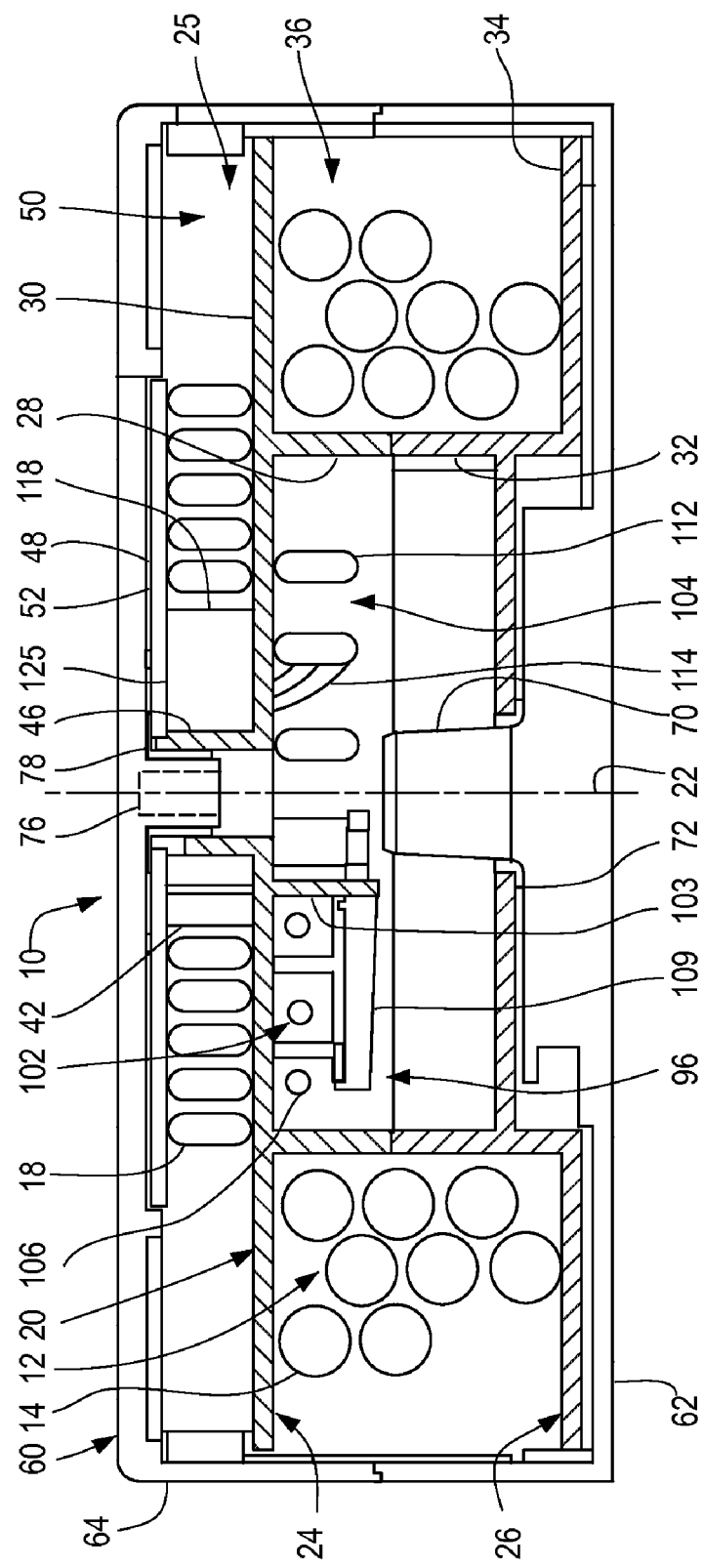
FIG. 3 is a side cross-sectional view of the retractable cord reel assembly.

First and second sections 24 and 26 are joined via cylindrical walls 28 and 32, thereby defining a cord retention chamber 36 between walls 30 and 34. Housing 60 for assembly 10 may define the outer walls, or periphery, of chamber 36 via rounded corners 38. Chamber 36 provides storage for cord retractable portion 14 in assembly 10, as can be seen in FIG. 3.

Attached to first section 24 on the side opposite wall 28 may be a second wall 46. Extending radially from second wall 46 may be fixed any number of small planar tabs 42, the radially outermost ends of which define a somewhat cylindrical inner boundary 44 of flat cord 18. Wall 46 may also define the inner boundary of flat cord 18 (see FIGS. 6A and 6B).

Spool 20 may also comprise a radial flange 48 mounted to abut cylindrical wall 46 and tabs 42. Flange 48 functions in part to position and maintain flat cord 18 in flat cord expansion chamber 50 (see FIG. 3), defined also by radial wall 30 and boundary 44. In a first preferred embodiment as shown, the outer walls, or periphery, of chamber 50 may be defined by housing 60 via rounded corners 40.

Radial flange 48 may contain any number of ventilation holes 52, allowing the dissipation of heat originating from flat cord expansion chamber 50. Because flat cord 18 cannot be removed from its expansion chamber 50, it may be more susceptible to overheating in certain uses than retractable cord portion 14. Other walls and flanges may also comprise ventilation holes (not shown) to further dissipate heat.

As can be seen in FIGS. 1-3, housing 60 illustratively comprises a base 62 configured for mounting on a wall or similar surface, and a cover 64 coupled to base 62 and facing away from the wall or substrate on which base 62 is mounted. As shown in FIG. 3, spool 20 may be aligned within housing 60 such that flat cord section 25 is nearer to cover 64 than round cord section retention chamber 36. This configuration allows greater dissipation of heat from flat cord expansion chamber 50, while still allowing sufficient dissipation of heat from cord retention chamber 36, due to the fact that at least part of retractable portion 14 may remain outside of housing 60 while in use.

To further disperse heat generated by flat cord 18 into the external environment, cover 64 may possess fin-like ridges 66 and/or ventilation holes 68, visible in FIGS. 1-2. Cover 64 and base 62 may be fixed together via fasteners, such as screws, fastened through various holes 82 through cover 64 and finishing within base 62. Holes 84 through the entire housing may facilitate the mounting of assembly 10 to an external surface via fasteners. In the center of the inside of base 62 and substantially along axis 22 may be attached a base axle 70, a cylindrical appendage to be coupled to second section 26. A spring (not shown) may also be added to connect axle 70 to second section 26 in a manner that will bias the spool assembly to rotate and retract an extended cord. Second section 26 may possess an axle hole 74 to accept base axle 70. Bottom bearing 72, an annular bearing located in axle hole 74, may facilitate the contact between second section 26 and base axle 70, allowing rotation of second section 26 along axis 22 relative to base 62. Cover 64 may possess a top axle 76, a similar cylindrical appendage to base axle 70, wherein top axle 76 may be coupled to a top bearing 78 located within a top section axle hole 80. Rotatable sections coupled to axles 76 and 70 may enable the rotation of spool 20 relative to the stationary housing 60 of assembly 10. Alternatively, materials may be selected for the various components to eliminate the need for separate bearings 72 or 78.

Housing 60 illustratively possesses a hole 86 (visible in FIG. 5) radially aligned with and of similar width to cord retention chamber 36 for access to retractable portion 14. Hole 86 may be formed of an opening 88 in cover 64 and an opening 89 in base 62, supported by cylindrical supports 90. Cylindrical supports 90 may be covered by rollers 92 to facilitate the sliding of retractable portion 14 past hole 86 during withdrawal. Hole 94 (shown in FIG. 1) in cover 64 on the opposite end of the assembly from hole 86 may allow passage of stationary end 16 through housing 60.

Figure 4:
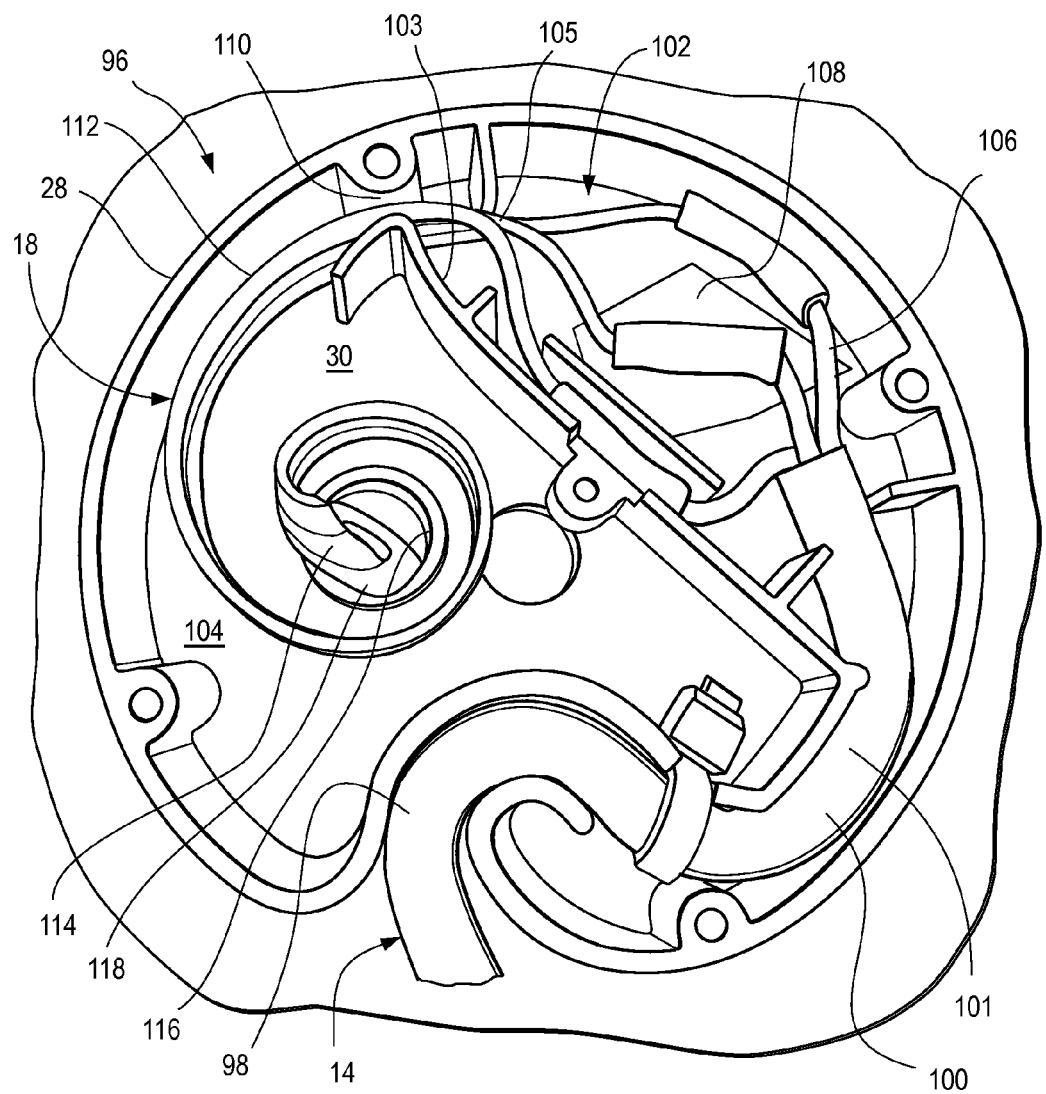
FIG. 4 depicts an interior chamber of the retractable cord reel assembly, the interior chamber containing splicing and connecting elements of the reel.

To facilitate a constant connection between the retractable portion 14 and the flat portion 18 of cord 12, the innermost wound portion of retractable portion 14 may be spliced in an inner chamber 96, shown in FIG. 4. Inner chamber 96 is illustratively attached to first section 24 and contained within cylindrical wall 28. FIG. 4 illustrates a preferred embodiment of the inner chamber 96 of assembly 10 in detail.

As can be seen in FIG. 4, retractable portion 14 may enter a gap 98 in cylindrical wall 28, after which it may curve back through a narrow passage 100 along the inside of cylindrical wall 28. Passage 100 is illustratively designed to hold the end 101 of retractable portion 14 in place while preventing the passage of dirt, debris, or fluids into inner chamber 96. Inner chamber 96 may be divided into two portions, a splicing chamber 102 and an expansion chamber 104. Chambers 102 and 104 may be separated by a wall 103. Those of skill having the teachings of the present invention would understand that the present invention also encompasses alternative configurations for the flat cord 18 whereby the periphery of chamber 50 may be defined by a cylindrical wall (not shown) to radial wall 30. In such an alternative configuration, those of skill would understand that the ferrule or rotation aperture would be mounted to the housing near the axis of rotation (as opposed to the spool). Also in such an alternative embodiment, at least some of the features shown in FIG. 4 (e.g., coil 112 and splicing chamber 102) could also be located on the housing, e.g., cover 64.

In the disclosed embodiment, inner wires 106 of cord 12 are exposed in splicing chamber 102, where they are separated and connected to a separated end 105 of flat portion 18. Three wires 106 are shown in the present embodiment, but any number of wires 106 may be present depending on the use and type of cord 12. Insulation such as heat shrink tube or electrical tape may be used to surround and protect the spliced ends of cord segments 105 and 106. Once connections are made, splicing chamber 102 may be filled with in part or entirely with a filler 108 such as epoxy or silicone. Filler 108 is designed to protect wires 106 from elements, allowing assembly 10 to be used in water-laden or hazardous environments, i.e. those containing flammable vapors. Wires 106 may also be held in place by a cover 109 adjacent to wires 106 and on their side opposite first section 24. Properly spaced splices retained by walls, tabs, covers and/or fillers may not need additional insulation such as heat shrink tube or tape.

Separated ends 105 of flat portion 18 may join in their flat configuration while passing through a thin passage 110 dividing splicing chamber 102 and expansion chamber 104. Flat portion 18 may contain a helical coil of surplus wire 112—the purpose of which is described below—in expansion chamber 104. Coil 112 may terminate in a ninety degree rotation 114 of flat portion 18 through an aperture 116 leading to flat cord expansion chamber 50.

Beyond aperture 116, FIGS. 1 and 2 show a cylindrical ferrule 118 through which flat portion 18 passes before entering flat cord expansion chamber 50. Ferrule 118 and aperture 116 may be located along round inner boundary 44 of flat portion 18 in place of one of the tabs 42. Ferrule 118 may contain a slit 120 through its wall parallel to its axis. Flat portion 18 may make a second ninety-degree rotation 122 through slit 120 before entering flat cord expansion chamber 50. Ferrule 118 is illustratively held in place by aperture 116 and a hole in flange 124, either of which may contain a washer 125 to facilitate the rotation of ferrule 118. Coil 112 may further facilitate the rotation of ferrule 118 by winding and unwinding within expansion chamber 104.

Figure 5:
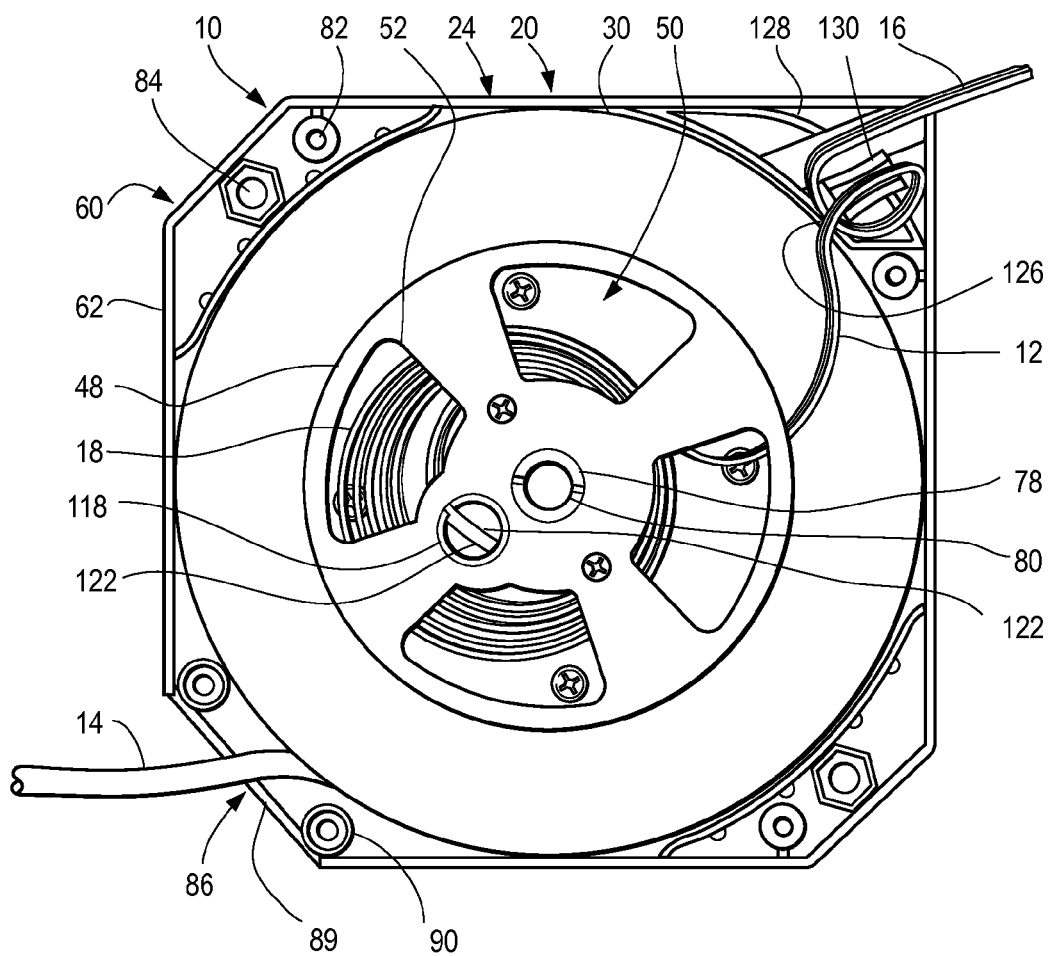
FIG. 5 is a top view of the retractable cord reel assembly with its cover removed.
Figure 6A:
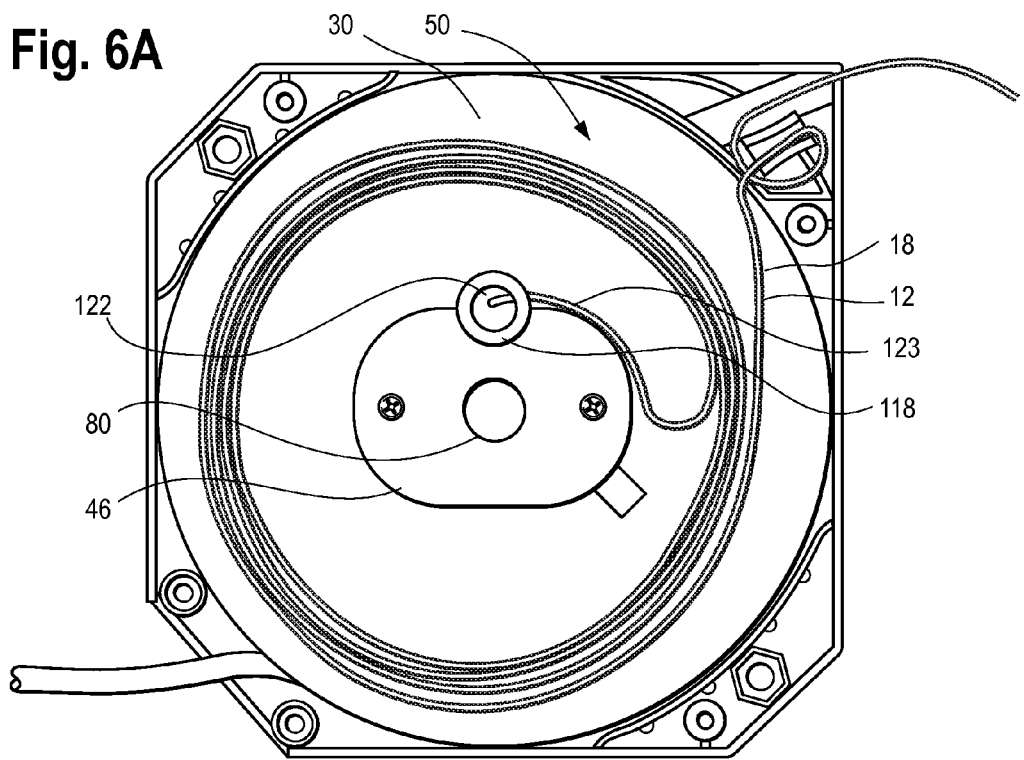
FIGS. 6A and 6B depict the movement of a ferrule during the expansion and opposite direction contraction of a flat cord contained within the cord reel assembly.
Figure 6B:
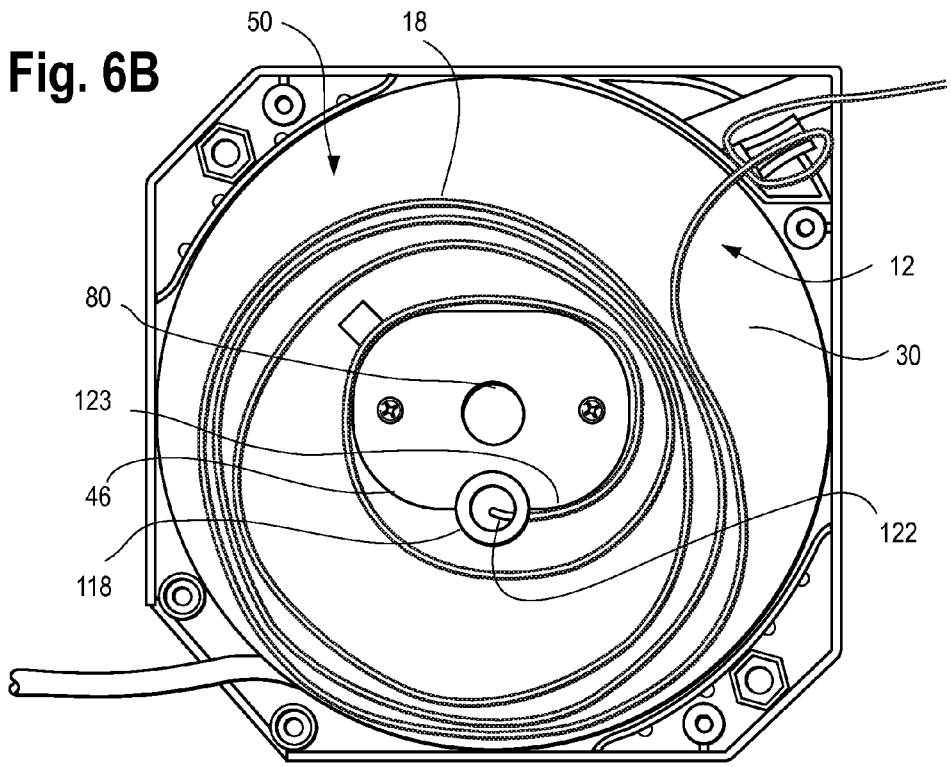

FIGS. 6A and 6B illustrate the desired rotation of ferrule 118. Flat portion 18 may coil away from inner boundary 44 to a stationary aperture 126 (see FIG. 5) within one of the rounded inner walls 40 of cover 64. (while aperture 126 is not visible in any of the figures, it is in the wall 40 on the inside of cover 64 near hole 94.) Because aperture is stationary during rotation of spool 20, withdrawal of retractable portion 14 may cause flat portion 18 to expand to a less tightly wound configuration in the outer edges of flat cord expansion chamber 50. Further rotation of spool 20 may cause flat portion 18 to coil back into the inner boundary of flat cord expansion chamber 50, however, coiled in the opposite direction from that which it started. The aforementioned reversal in the direction of the coil of flat portion 18 requires a flip in the direction a beginning segment 123 of flat portion 18 at round inner boundary 44. Rotation of ferrule 118 facilitates the changing direction of beginning segment 123, replacing any repetitive sharp bending of segment 123 that may otherwise cause wear, strain and potential failure. Allowing flat portion 18 to coil in two different directions may effectively allow for half (or perhaps even less) as much cord to be used in flat portion 18 as otherwise required.

As illustrated in FIG. 5, through aperture 126, the flat cord may enter a splice block 128. The interior of splice block 128 may direct flat portion 18 to hole 94 where it becomes stationary end 16. FIG. 5 shows flat portion 18 entering a narrow pass 130, which it coils back underneath to reach hole 94. Splice Block 128 allows the flat cable segment to be spliced again and joined to a stationary round cable. In one preferred embodiment the cables that are outside the housing may be round cables similar to the extendable cable. These cables are typically constructed of multiple primary wires individually insulated then covered with a protective insulating jacket. Splice block 128 may be filled with a potting compound such as epoxy or silicone to protect the spliced wires against the entry of dirt, debris, or elements.

Figure 7:
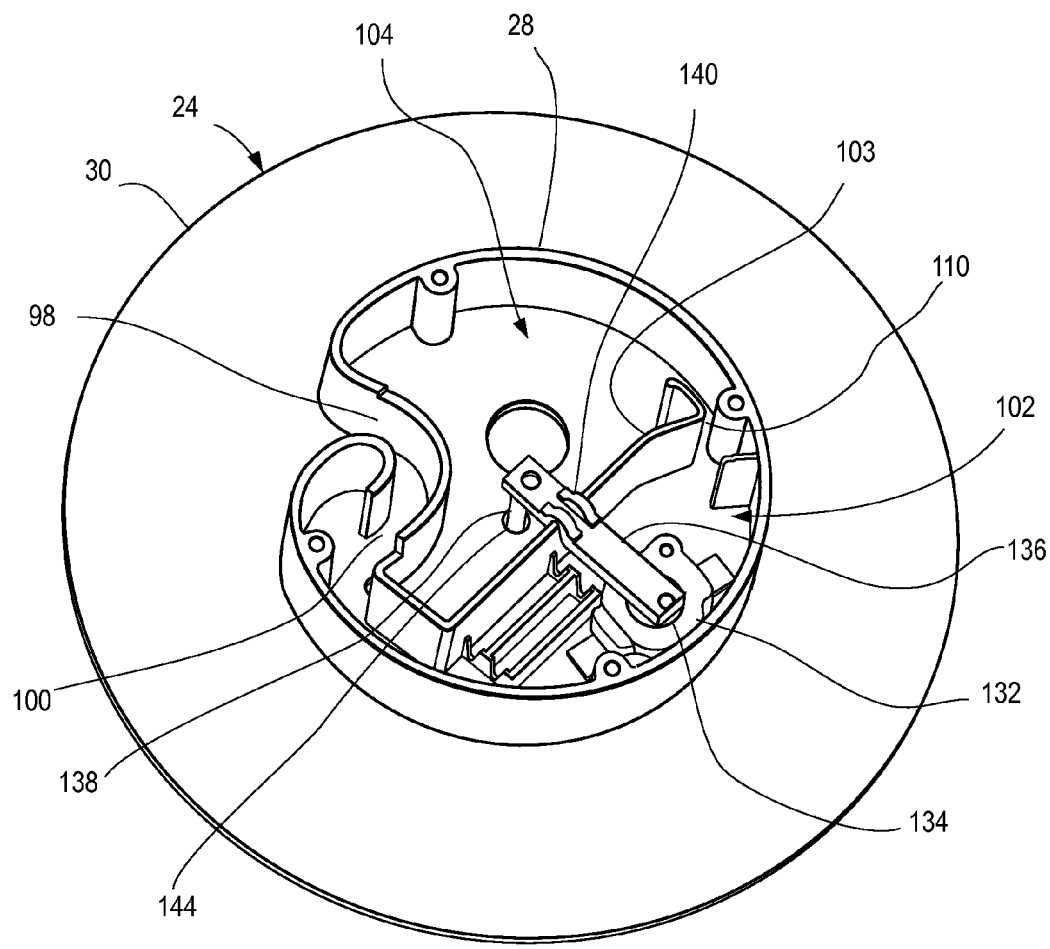
FIG. 7 is a perspective view showing a thermal overload protection device mounted on one embodiment of the present invention.

Assembly 10 may comprise a thermal overload protection device 132 coupled to wires 106, as illustrated in FIG. 7. Device 132 may be configured to automatically shut down during overheating. Device 132 may be covered with a rubber boot 134 covering or containing a reset button on device 132. Depressing of the rubber boot 134/button may manually reset device 132 after a shutdown—i.e. instead of an automatic reset. Rubber boot 134/button may be pressed by a lever 136 coupled to a rod 138. Lever 136 may be coupled at its fulcrum 140 to wall 103. This traversing of wall 103 may allow rod 138 to pass through hole 144 and through the middle of assembly 10 along axis 22, such that it is accessible to be pressed from the outside of cover 64. In this configuration, pressing in of rod 138 may cause lever 136 to depress rubber boot 134/button, resetting device 132.

While the disclosure is susceptible to various modifications and alternative forms, specific exemplary embodiments thereof have been shown by way of example in the drawings and have herein been described in detail. It should be understood, however, that there is not intent to limit the disclosure to the particular embodiments disclosed, but on the contrary, the intention is to cover all modifications, equivalents, and alternatives falling within the spirit and scope of the disclosure as defined by the appended claims.

What is claimed is:

1. A retractable cord reel apparatus, the apparatus comprising
    a housing,
    a spool within and arranged for rotation relative to the housing,
    wherein the spool is axially divided into a plurality of chambers, said spool defining a rotating aperture mounted on the rotating spool near the axis of spool rotation,
    a cord traversing the interior of the housing and terminating in retractable and stationary ends external to the housing,
    wherein, within a first of the plurality of chambers, the cord comprises a retractable coil wound around the axis of the spool and attached at its periphery to said retractable end through an aperture in the housing,
    wherein, within a second of said chambers, the cord comprises an expandable coil wound around the axis of the spool, said expandable coil having first and second ends, said expandable coil having its first end attached to the housing wherein, during retraction of the cord from the first chamber, the expandable coil expands towards the perimeter of the second chamber, after which, the expandable coil winds back into the core of the second chamber wound in a direction opposite that which it began,
    wherein the expandable coil enters the core of the second chamber through a rotating aperture arranged for rotation about its own axis, and
    wherein the rotating aperture rotates to accommodate the changing trajectory of the expandable coil.

2. The apparatus of claim 1, wherein a third chamber axially adjacent to the second chamber and interior to the first chamber contains a segment of cord connecting the retractable and expandable coils.

3. The apparatus of claim 2, wherein the rotating aperture is a ferrule and the segment comprises an expandable coil adjacent to the ferrule and centered about the axis of the ferrule.

4. The apparatus of claim 2, wherein the third chamber comprises a splicing section, the splicing section containing at least one type of filler selected from among the group consisting of silicone, thermoplastic polymer and epoxy.

5. The apparatus of claim 1, wherein the expandable coil enters the aperture in the housing via a splice block in the corner of the housing.

6. The apparatus of claim 5, wherein the splice block containing at least one type of filler selected from the group consisting of epoxy, thermoplastic polymer and silicone.

7. A retractable cord reel apparatus, the apparatus comprising
a housing,
a spool within and arranged for rotation relative to the housing,
wherein the spool is axially divided into a plurality of chambers, said housing defining a rotating aperture mounted on the housing near the axis of spool rotation,
a cord traversing the interior of the housing and terminating in retractable and stationary ends external to the housing,
wherein, within a first of the plurality of chambers, the cord comprises a retractable coil wound around the axis of the spool and attached at its periphery to said retractable end through an aperture in the housing,
wherein, within a second of said chambers, the cord comprises an expandable coil wound around the axis of the housing, said expandable coil having first and second ends, said expandable coil having its first end of the expandable cable is attached to the rotating spool near the perimeter of the second chamber wherein, during retraction of the cord from the first chamber, the expandable coil expands towards the perimeter of the second chamber, after which, the expandable coil winds back into the core of the second chamber wound in a direction opposite that which it began,
wherein the expandable coil enters the core of the second chamber through a rotating aperture arranged for rotation about its own axis, and
wherein the rotating aperture rotates to accommodate the changing trajectory of the expandable coil.

8. The apparatus of claim 7, wherein a third chamber axially adjacent to the second chamber and interior to the housing contains a segment of cord coiled to accommodate connecting the retractable and expandable coils.

9. The apparatus of claim 8, wherein the rotating aperture is a ferrule and the segment comprises an expandable coil adjacent to the ferrule and centered about the axis of the ferrule.

10. The apparatus of claim 8, wherein the third chamber comprises a splicing section, the splicing section containing at least one type of filler selected from among the group consisting of silicone, thermoplastic polymer and epoxy.

11. The apparatus of claim 7, wherein the rotating spool contains a splicing section axially adjacent to the second chamber and interior to the first chamber.

12. The apparatus of claim 11, wherein the splicing section contains at least one type of filler selected from the group consisting of epoxy, thermoplastic polymer and silicone.

13. A retractable cord reel apparatus, the apparatus comprising
a housing, wherein the housing comprises a base mountable to a surface and a cover opposite the base,
a spool within and arranged for rotation relative to the housing,
wherein the spool is axially divided into a plurality of chambers, said spool defining a rotating aperture mounted on the rotating spool near the axis of spool rotation, wherein, within a first of the plurality of chambers, the cord comprises a retractable round cord wound around the axis of the spool and attached at its periphery to said retractable end through an aperture in the housing,
wherein the outer extremity of the retractable cord coil comprises a retractable end capable of withdrawal through a hole in the housing,
wherein, within a second of said chambers, the cord comprises flat cord wound around the axis of the spool, said flat cord having first and second ends, said flat cord having its first end attached to the housing wherein, during retraction of the cord from the first chamber, the flat cord expands towards the perimeter of the second chamber, after which, the flat cord winds back into the core of the second chamber wound in a direction opposite that which it began,
wherein the outer extremity of the flat coil forms a stationary end by exiting the apparatus via a hole in the housing,
wherein the inner most portions of each of the round and flat coils are spliced together in a third chamber interior to the round cord chamber, and
wherein the flat cord chamber is located adjacent to the cover.

14. The apparatus of claim 13, wherein the flat cord chamber is delineated on its side nearest to the cover at least partially by a radial flange attached to the spool.

15. The apparatus of claim 14, wherein the flange comprises a plurality of ventilation holes.

16. The apparatus of claim 13, wherein the cover comprises a plurality of ventilation holes.

17. The apparatus of claim 13, wherein the cover comprises a plurality of heat dissipation ridges lining its surface.

18. The apparatus of claim 13 wherein a splicing section within the third chamber containing at least one type of filler selected from the group consisting of silicone, thermoplastic polymer and epoxy.

19. A retractable cord reel apparatus, the apparatus comprising
a housing supporting a cord,
wherein the cord comprises an expansion segment and a retractable segment, each of which is coiled around a rotatable spool, each of said expansion and retractable segments having a first end and a second end, the first end of the expansion segment in operating communication with the first end of the retractable segment
wherein the retractable segment may be withdrawn from the housing, causing rotation of the spool and simultaneous expansion of the expansion segment within an expansion chamber,
wherein the second end of the expansion segment forms a stationary end outside of the housing,
a thermal overload protection device coupled to the cord,
wherein the thermal overload protection device stops a flow of electricity through the apparatus during overheating, and
wherein the thermal overload protection device comprises a manual reset button.

20. The apparatus of claim 19, wherein the reset button is protected by, but still accessible through an elastomer boot.

21. The apparatus of claim 19, wherein the first end of the expansion segment and the first end of the retractable segment are connected via a splicing segment of cord in an interior chamber located radially inward of the portion of the spool supporting the retractable cord.

22. The apparatus of claim 21, wherein the thermal overload protection device is coupled to the splicing segment of cord.

23. The apparatus of claim 21, wherein the section of the interior chamber connecting the splicing segment contains at least one type of filler selected from the group consisting of epoxy, thermoplastic polymer and silicone.

24. The apparatus of claim 23, wherein the button external to the housing may be coupled to a rod through the axis of the spool, wherein the rod is in communication with the thermal overload protection device, and wherein pressing of the external button causes pressing of the reset button.

25. The apparatus of claim 19, wherein the reset button may be accessed via a button external to the housing.

* * * * *